United States Patent [19]

Timm

[11] Patent Number: 4,666,673

[45] Date of Patent: * May 19, 1987

[54] APPARATUS FOR PREPARING LARGE QUANTITIES OF UNIFORM SIZE DROPS

[75] Inventor: Edward E. Timm, Coleman, Mich.

[73] Assignee: The Dow Chemical Company, Midland, Mich.

[ * ] Notice: The portion of the term of this patent subsequent to Apr. 24, 2001 has been disclaimed.

[21] Appl. No.: 732,980

[22] Filed: May 13, 1985

Related U.S. Application Data

[63] Continuation-in-part of Ser. No. 607,535, May 7, 1984, abandoned, which is a continuation-in-part of Ser. No. 588,588, Mar. 12, 1984, abandoned, which is a continuation-in-part of Ser. No. 398,007, Jul. 14, 1982, Pat. No. 4,444,961, which is a continuation-in-part of Ser. No. 283,779, Jul. 16, 1981, abandoned, which is a continuation-in-part of Ser. No. 202,265, Oct. 30, 1980, abandoned.

[51] Int. Cl.[4] .................................................. C08F 2/00
[52] U.S. Cl. ..................................... 422/135; 422/134; 526/88
[58] Field of Search ................... 526/88; 422/134, 135

[56] References Cited

U.S. PATENT DOCUMENTS

| | | | |
|---|---|---|---|
| 2,606,174 | 8/1952 | Kolthoff et al. | 526/88 |
| 3,204,934 | 9/1965 | Graham et al. | 422/256 |
| 3,226,092 | 12/1965 | Graham et al. | 422/256 |
| 3,488,159 | 1/1970 | Moon et al. | 422/257 |
| 3,922,255 | 11/1975 | Koestler et al. | 526/65 |
| 4,017,670 | 4/1977 | Spicuzza, Jr. et al. | 526/88 |
| 4,071,670 | 1/1978 | Vanzo et al. | 526/88 |

*Primary Examiner*—Paul R. Michl
*Assistant Examiner*—Alex H. Walker

[57] ABSTRACT

Spheroidal polymer beads having a uniform size are prepared by polymerizing uniformly sized monomer droplets formed by the vibratory excitation of a laminar flow jet of monomeric material flowing in a continuous liquid medium containing a suitable suspending agent. In the apparatus employed, the means for vibratorily exciting the laminar flow jet is parallel to the axis of the monomer jet. For example, the laminar flow jet of a monomer mixture and a polymerization initiator can be subjected to vibratory excitation and the resulting monomer droplets are polymerized to yield copolymer beads. The apparatus employed allows for the preparation of large numbers of monomer droplets.

11 Claims, 4 Drawing Figures

APPARATUS FOR PREPARING LARGE QUANTITIES OF UNIFORM SIZE DROPS

CROSS-REFERENCE TO RELATED APPLICATIONS

This application is a continuation-in-part of copending U.S. patent application Ser. No. 607,535, filed May 7, 1984 now abandoned, which is a continuation-in-part of copending U.S. patent application Ser. No. 588,588, filed Mar. 12, 1984 now abandoned, which is a continuation-in-part of U.S. patent application Ser. No. 398,007, filed July 14, 1982 now U.S. Pat. No. 4,444,961, which is a continuation-in-part of U.S. patent application Ser. No. 283,779, filed July 16, 1981 now abandoned, which is a continuation-in-part of U.S. patent application Ser. No. 202,265, filed Oct. 30, 1980 now abandoned.

BACKGROUND OF THE INVENTION

The present invention relates to the preparation of polymer beads, and in particular, to an apparataus for use in preparing polymer beads which have a relatively uniform particle size.

A wide variety of polymers including polymers of a monovinylidene aromatic such as styrene or esters of an unsaturated carboxylic acid such as acrylic or methacrylic acid esters are prepared in spheroidal bead form using suspension polymerization techniques. Conventionally, suspension polymerization consists of dispersing a monomer as droplets in a vessel equipped with an agitator and containing a continuous phase in which the monomers and resulting polymer are essentially insoluble. The dispersed monomer droplets are subsequently polymerized while maintaining continuous agitation.

Unfortunately, the spheroidal polymer beads prepared by conventional suspension polymerization techniques exhibit a relatively broad particle size distribution. This is generally undesirable for the reason that spheroidal polymer beads employed in most applications advantageously exhibit a generally uniform particle size. For example, the ion exchange resins prepared from copolymer beads of a monovinylidene aromatic and a polyvinylidene aromatic advantageously exhibit a narrow particle size distribution to provide the desired flow characteristics to an ion exchange resin bed comprising said resin. Therefore, a significant percentage of the polymer beads prepared using conventional suspension polymerization techniques possess particle sizes undesirable for their intended application. Such undesirably sized beads are normally wasted or employed in applications of less economic desirability.

Numerous methods are disclosed which propose improved uniformity of polymer beads which are prepared using suspension polymerization techniques. See, for example, U.S. Pat. Nos. 3,728,318; 3,862,924; 2,694,700; 2,932,629; and 3,922,255. Unfortunately, such disclosed methods are not as economical or efficient as would be desirable.

An improved process for preparing spheroidal polymer beads of uniform particle size is disclosed in U.S. Pat. No. 4,444,961. Said process employs an apparatus comprising (1) a monomer reservoir containing a monomer phase comprising a polymerizable monomer, (2) a column containing a continuous phase of a suspending liquid immiscible with the polymerizable monomer or monomer phase and a stabilizing amount of a suspending agent, (3) a monomer jet forming means in intimate contact with the monomer phase and the continuous liquid phase and having an opening connecting the monomer reservoir with the column containing the continuous phase such that the monomer phase passing therethrough into the continuous phase is capable of being a jet having laminar flow characteristics, (4) a vibratory exciter capable of vibratorily exciting the laminar flow jet of the monomer phase such that the monomer jet is broken into droplets and (5) a means for polymerizing the monomer in suspension at conditions such that significant coalescence or additional dispersion of the monomer droplets does not occur.

Unfortunately, the suggested circular geometry of the aforementioned apparatus has a limited capacity for producing large quantities of droplets. It is believed that such limited capacity is the result of radial inflow of the continuous phase of suspending liquid; and mechanical resonances in the piston and vibrator assembly.

In view of the deficiencies of the prior art, it would be highly desirable to provide an apparatus which can be employed in a process for preparing uniformly sized polymer beads wherein said apparatus has a greater capacity for producing droplets (i.e., a capacity for producing large numbers of droplets).

SUMMARY OF THE INVENTION

The present invention is an apparatus for preparing large numbers of spheroidal polymer beads. The apparatus comprises (1) a monomer reservoir containing a monomer phase comprising a polymerizable monomer, (2) a dispersion collection chamber containing a continuous phase of a suspending liquid immiscible with the polymerizable monomer or monomer phase and a stabilizing amount of a suspending agent, (3) a monomer jet forming means having a length greater than the cross-sectional width thereof and capable of forming a multiplicity of monomer jets which is in intimate contact with the monomer phase in the monomer reservoir and the continuous liquid phase in the dispersion collection chamber, and which has a multiplicity of openings connecting said reservoir and said collection chamber, such that the monomer phase passing therethrough into the continuous phase is capable of being a jet having laminar flow characteristics, (4) a vibratory exciter capable of vibratorily exciting the laminar flow jet of the monomer phase such that the monomer jet is broken into droplets wherein the vibratory exciter is essentially parallel to the axis of the monomer jet, and (5) a means for polymerizing the monomer in suspension at conditions such that significant coalescence or additional dispersion of monomer droplets does not occur.

Surprisingly, by the practice of the present invention, monomer droplets exhibiting exceptionally uniform, e.g., the monomer droplets having a coefficient of variance (i.e., twice the standard deviation divided by the arithmetic mean) of less than about 0.05, can be formed. Although the droplets are known to collide with one another immediately upon formation, the droplets unexpectedly exhibit minimum coalescence and spheroidal polymer beads having an unexpectedly uniform particle size can be prepared. For example, spheroidal polymer beads can be prepared by the practice of the present invention having a sufficiently uniform particle size such that about 90 volume percent of the beads possess a particle diameter from about 0.9 to about 1.1 times the volume average particle diameter of the beads. Conversely, using conventional suspension polymerization techniques, less than about 30 to about 40 volume percent of beads are found to exhibit such uniform particle size. Moreover, the spheroidal polymer beads prepared by the method of this invention generally exhibit the other properties desired of polymers prepared in bead form (e.g., the beads employed in the subsequent preparation of ion exchange resins are not excessively cracked or spalled).

Therefore, the apparatus of the present invention are useful in the preparation of uniformly sized spheroidal polymer beads from polymerizable monomers, particularly monomers such as styrene and vinyl chloride which are polymerizable using conventional suspension polymerization techniques. The method and apparatus are particularly useful in the preparation of uniform size beads of a polymer of a monovinylidene aromatic and a cross-linking agent copolymerizable therewith (e.g., a polyvinylidene aromatic such as divinylbenzene) which beads are useful in the subsequent preparation of ion exchange resins.

The ion exchange resins prepared using the apparatus of this invention can exhibit superior properties, particularly in continuous ion exchange operations. The ion exchange resins are useful in processing water and various other chemicals. For example, ion exchange resins are useful in chromatographic separation applications. Of specific interest are the use of said ion exchange resins in the separation of fructose from glucose wherein the maximum efficiency of each ion exchange bead is obtained, thereby causing unexpectedly superior results in said separation. The ion exchange resins are useful in water processing and purification applications, such as mixed bed, layered bed and single bed processes for applications such as condensate polishing. The ion exchange resins are also useful in chemical processing applications, such as in processes for the recovery of ions (e.g., metal ions) from aqueous mediums. In addition, the method of this invention is useful in the preparation of expandable polymer beads such as expandable polystyrene and in the preparation of seeded beads having a uniform particle size wherein the seeded beads are prepared from seed beads manufactured by the disclosed method.

BRIEF DESCRIPTION OF THE DRAWINGS

Understanding of this invention will be facilitated by referring to the accompanying drawings, in which.

DETAILED DESCRIPTION OF THE INVENTION

Figure 1:
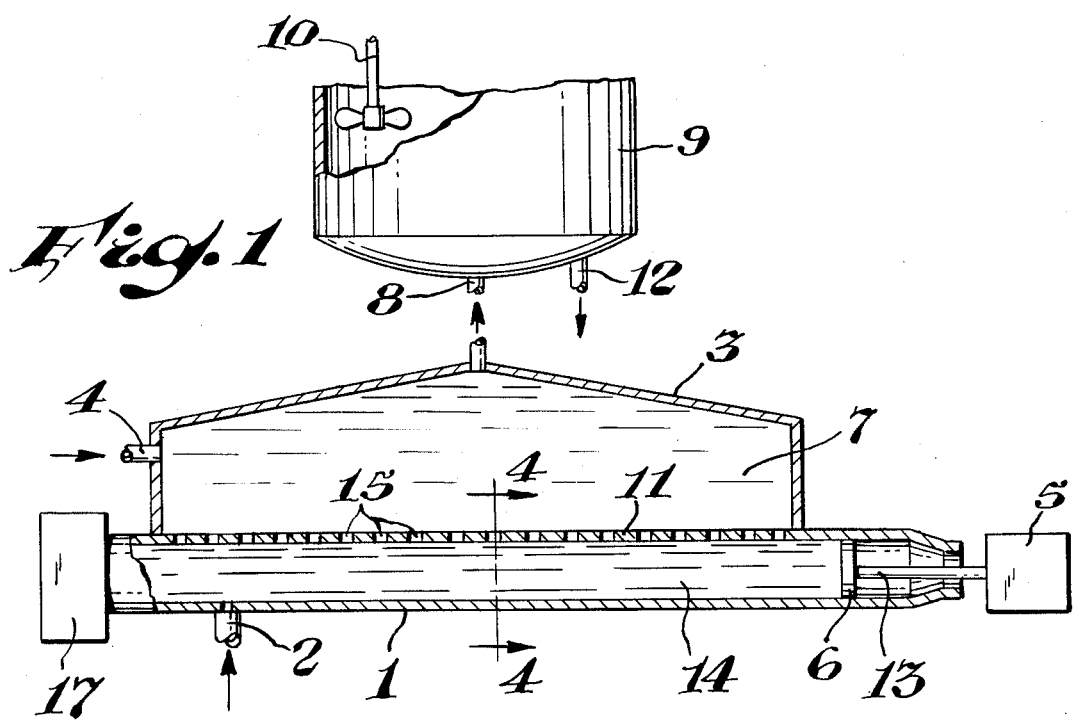
FIG. 1 is a schematic representation, partially in cross-section, which illustrates an embodiment of the present invention.
Figure 2:
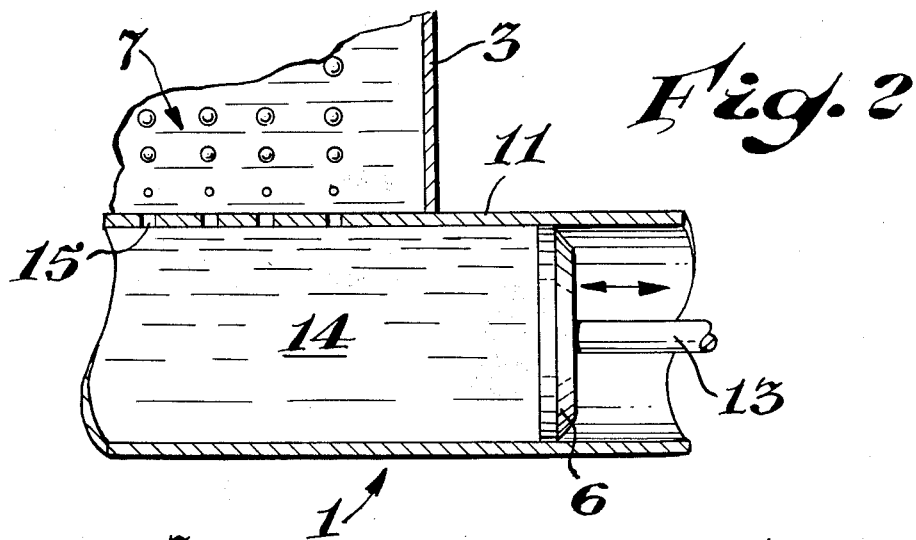
FIG. 2 is a schematic representation, partially in cross-section, illustrating in detail a portion of FIG. 1.

Referring now more particularly to the drawings, FIGS. 1 and 2 depict a monomer reservoir 1 which contains a monomer phase 14 comprising a polymerizable monomer. The monomer reservoir communicates with a source of monomer (not shown) by means of monomer feed conduit 2. Dispersion collection chamber 3 contains a continuous phase 7 of a suspension medium comprising a suspending liquid immiscible with the monomer or monomer phase in reservoir 1 and a stabilizing amount of suspending agent. Dispersion collection chamber 3 communicates with a source (not shown) of the suspension medium by means of suspending liquid supply conduit 4.

A monomer jet forming means such as orifice plate assembly 11 is in intimate contact with the monomer phase 14 contained by reservoir 1 and the continuous liquid phase of dispersion collection chamber 3. Orifice plate 11 has typically, as depicted by the Figures, a plurality of passages 15 connecting the monomer and continuous liquid phases. The length of the orifice plate assembly 11 or orifice assembly 11 is such that the length is greater than the cross-sectional width thereof. For example, the length of the orifice assembly 11 can have a length of about twice that of the cross-sectional width thereof. Preferably, the length of the orifice assembly 11 is about 10 times, more preferably greater than about 20 times, the cross-sectional width thereof. A means for vibratorily exciting the laminar flow jet comprises a piston 6 or similar means such as a diaphragm which is in intimate contact with the monomer phase in reservoir 1. As depicted in the figures, the face of the piston 6 is essentially parallel to the axis of the monomer jet which is illustrated as droplets in the continuous phase 7. As depicted in the figures, piston 6 is mechanically connected by rod 13 to a variable-frequency vibrator or oscillator 5 in a manner such that piston 6 vibrates at the frequency generated by vibrator 5.

An effluent conduit 8 is provided at or near the end of dispersion collection chamber 3 opposite the monomer reservoir 1 in order to transfer the monomer droplets and any excess liquid from dispersion collection chamber 3 to polymerization reactor 9 equipped with an agitation means such as agitator 10. The reactor 9 is fitted with polymer product removal line 12.

In operation, the monomer phase 14 comprising a polymerizable monomer, including mixtures of one or more copolymerizable monomers and mixtures of one or more copolymerizable monomers with a non-polymerizable material, e.g., inert porogenic or pore-forming material, prepolymer or the like, is introduced into monomer reservoir 1 through conduit 2. In general, the monomer phase 14 includes a polymerization initiator suitable for initiating the polymerization of the monomer. The monomer phase is fed into reservoir 1 at a rate such that the monomer phase is forced through the plurality of the passages 15 of jet forming means (e.g., orifice plate assembly) 11 into the continuous phase suspending medium 7 contained by dispersion collection chamber 3 at a rate sufficient to form a jet having laminar flow characteristics. In this invention, the flow characteristics of the monomer jet are described by the dimensionless Reynolds number (Re) said Reynolds number being defined as disclosed in U.S. Pat. No. 4,444,961.

Figures 3, 4:
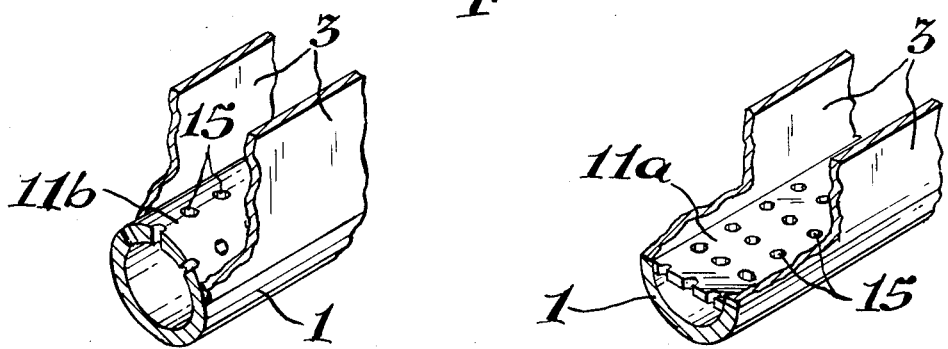
FIG. 3 is an isometric representation, partially in cross-section, illustrating in detail a portion of FIG. 1, taken along line 4—4 of FIG. 1.
FIG. 4 is an isometric representation, partially in cross-section, illustrating in detail a portion of FIG. 1 taken on line 4—4 of FIG. 1.

Referring more particularly to FIGS. 3 and 4, said figures depict a portion of the monomer reservoir 1, an orifice assembly 11a and 11b having a plurality of passages 15 connecting the monomer phase (not shown) and the continuous liquid phase (not shown) in the dispersion collection chamber 3. The orifice assembly 11a and 11b can be planar (i.e., flat), as illustrated in FIG. 3 at 11a, or rounded, as illustrated in FIG. 4 at 11b. The orifice assembly 11a and 11b having a plurality of passages 15 is of a shape such that the cross-sectional width is narrower than the length thereof. For example, a rectangular geometry is preferred wherein the length of the orifice plate assembly 11 is substantially greater than the width thereof.

As the monomer jet flows into the continuous phase 7, the jet is vibratorily excited at a frequency which breaks the jet into droplets. In general, the monomer jet is excited at conditions such that generally uniform sized droplets are prepared. As depicted by the Figures, such vibrational excitation can be provided by the variable-frequency vibrator 5 and transmitted to the monomer phase 14 by piston 6. The specific conditions at which the droplets are formed, i.e., the flow characteristics of the monomer jet and vibratory excitement thereof depend on a variety of factors, particularly the desired size and uniformity of the monomer droplets and the resulting spheroidal polymer beads.

The suspending liquid, which liquid is immiscible with the monomer or monomer phase comprising the continuous phase 7 of dispersion collection chamber 3, is introduced thereto by means of line 4. In general, sufficient amounts of suspending agent to stabilize the monomer droplets are added therewith. Alternatively, the suspending agent can be introduced separately into dispersion collection chamber 3, such as by different points of addition at various positions throughout dispersion collection chamber 3.

In those operations, such as depicted by the Figures wherein the monomer phase possesses a lower density than the density of the suspension medium, the monomer droplets are allowed to rise through the suspension medium for subsequent removal from the top of dispersion collection chamber 3 for transfer to the polymerization reactor 9 by transfer conduit 8. In such operations, the suspending liquid is advantageously introduced into dispersion collection chamber 3 in close proximity to the monomer reservoir 1, flowed upwardly and transferred from dispersion collection chamber 3 to the polymerization reactor in a cocurrent type operation. Alternatively, but less advantageously, in such operations the suspending liquid can be introduced at or near the end of a dispersion collection chamber 3 opposite monomer reservoir 1 in a countercurrent type operation or the monomer droplets can be prepared in a suspension medium having a zero flow motion, i.e., the continuous liquid phase 7 contained by dispersion collection chamber 3 is static.

In various operations, the monomer phase can possess a higher density than the suspension medium and the monomer droplets are allowed to drop therethrough. In such operations, the suspending liquid may also be employed in cocurrent, countercurrent or zero flow motion, with cocurrent flow again being most advantageously employed.

In a typical operation, although the monomer can be partially polymerized as it moves through dispersion collection chamber 3, typically the conditions are maintained such that essentially no polymerization of monomer occurs prior to the transfer of the monomer droplets to the polymerization reactor 9. In general, the monomer and continuous phases are maintained at temperatures from ambient temperatures (e.g., from about 18° to about 25° C.) to about 70° C. To prevent substantial polymerization in the column and to most effectively employ the suspending agent, temperatures from about 40° to about 50° C. are most preferred. Both the monomer droplets and suspension medium are transferred to the polymerization reactor 9. The polymerization of the monomer is subsequently conducted employing conventional techniques which generally comprise batchwise polymerization techniques consisting of heating the monomer under free radical forming conditions, with the suspending liquid serving as the polymerization medium. In general, additional amounts of the same or a different suspending agent are advantageously added to polymerization reactor 9 to help maintain the uniform particle size of the droplets during polymerization. Upon completion of polymerization, the uniformly sized polymer beads are withdrawn from the polymerization vessel for subsequent recovery using conventional dewatering techniques such as filtration, centrifugation, decantation, or the like.

With regard to the various components of the present invention, jet forming means 11 is suitably any means comprising a plurality of passages through which the monomer phase can be passed at conditions such that a jet or plurality of jets of the monomer phase is formed having laminar flow characteristics. Although the jet forming means 11 can consist of one or more capillary tubes, it is more advantageous to employ a plate or similar device having many passages, e.g., a perforated plate or oblong disc, wherein each passage 15 is advantageously generally a cylindrical or slightly frusto-conical passage of the same dimensions. In general, the diameter of the passage openings 15 can range from less than about 0.05 mm to greater than about 6 mm wherein diameter refers to that cross-section of the passage having the smallest diameter. The diameter of each passage opening is primarily determined by the desired size of the monomer droplets. Typically, the desired droplet size will vary from about 0.15 to about 5 mm, more typically from about 0.15 to about 1.5 mm, most typically from about 0.2 to about 1 mm. While the passage diameter which will produce this size droplet is dependent on a variety of factors including the physical properties, e.g., viscosity, density and surface tension, of the monomer and continuous phases, and the conditions of the vibrational excitation, typically, passage diameters from about 0.06 to about 0.6, more typically from about 0.08 to about 0.4, mm are employed. Using passages having such diameters, the length of each passage, i.e., that distance through which the monomer phase contacts essentially the entire circumference of the passage, is advantageously less than about 10 times the diameter of the opening. Preferably, the length to diameter ratio (L/d) of the passages is from about 0.2 to about 2.

The passages 15 in the orifice plate 11 are spaced a sufficient distance apart from each other such that the formation mechanism required to prepare the uniformly sized monomer droplets and the stability of the resulting droplets are not significantly and deleteriously affected by the laminar jet and droplet formation of an adjacent jet. In general, interactions between the droplet formation of adjacent jets are not significant when a passage is spaced at a distance of at least about 20 times the diameter of each opening apart from the nearest passage thereto, when said distance is measured from the center of each passage. A minimum distance, center to center, of at least about 1 mm is preferred. In addition, modifications which minimize the effect of the adjacent monomer jets such as providing a protective cavity which protects each of the monomer jets until broken into droplets are often advantageously provided in the orifice plate.

Although the orifice plate 11 can be prepared from a variety of materials including metal, glass, plastic or rubber, a perforated metal plate is preferably employed.

The vibration is suitably provided by any means which oscillates or vibrates at a frequency capable of exciting the monomer jet at vibrational characteristics such that the monomer jet is broken into droplets, preferably, droplets of a general uniform size. The pressure wave which is generated by the means for vibratorily exciting the laminar flow jet can be either parallel (i.e., giving rise to transverse waves) or perpendicular (i.e., giving rise to longitudinal waves) to the axis of the monomer jet. The monomer jet is most preferably subjected to transverse excitation due to ease of apparatus design. Generally, frequencies from about 70 to about 7,000, advantageously from about 100 to about 1,000 hertz, give the desired vibrational characteristics. In general, vibratory means such as mechanical, electroacoustic, hydroacoustic or electromagnetic vibrators and magnetoresistive transducers well known in the art can be employed herein. Electromagnetic vibrators are more generally preferred.

In order to prevent the formation of standing pressure waves in the monomer chamber 1, a means is provided in order to prevent the reflection of pressure waves radiated from the face of the piston 6. Thus, at the end of the monomer chamber 1 opposite the piston 6 is provided a means for trapping pressure waves, such as a wave trap 17. Such a wave trap 17 is particularly desirably employed when the length of the monomer chamber is greater than or equal to one quarter of the wavelength of the pressure waves.

The monomer phase comprises one or more polymerizable monomers which forms a discontinuous phase dispersed throughout the suspension medium upon the formation of droplets thereof. Polymerizable monomers advantageously employed in the practice of this invention are polymerizable monomers or mixtures of two or more copolymerizable monomers which monomers or monomer mixtures are sufficiently insoluble in a liquid (which liquid may contain a surfactant) to form droplets upon the dispersion of the monomer therein. Monomers having only limited miscibility in water such as acrylonitrile can also be employed herein. Advantageously, the polymerizable monomers are monomers polymerizable using suspension polymerization techniques. Exemplary monomers are disclosed in U.S. Pat. No. 4,444,961.

Advantageously, the monomer droplets are prepared at temperatures and conditions which minimize the polymerization reaction prior to or during droplet formation. For most monomers, ambient temperatures, e.g., temperatures from about 18° to about 25° C., are preferred for droplet formation. The resulting monomer is subsequently polymerized using conventional suspension polymerization techniques well known in the art. In general, such conventional techniques consist of exposing the droplets of monomer to polymerization at elevated temperatures under free radical forming conditions. Typically, temperatures from about 50° to about 100° C. are generally sufficient to cause polymerization of the monomer. During polymerization, which polymerization may be continuous or batchwise, sufficient agitation is provided to maintain a dispersion of the uniformly sized droplets and to provide adequate heat transfer, i.e., maintain a reasonably uniform temperature throughout the reaction medium.

The monomer droplets are advantageously polymerized in a polymerization vessel which is separate from the column in which the droplets are formed. By polymerizing the droplets in a separate polymerization vessel, sufficient agitation can be provided to maintain a dispersion of the uniformly sized droplets in the polymerization vessel without causing undesirable currents in the dispersion collection chamber which adversely affect the uniformity of the droplets being formed therein. Preferably, the monomer droplets move up or down through the dispersion collection chamber according to the relative density of the monomer phase and suspending medium in a zero-flow or cocurrent flow type operation. The droplets continue to rise or fall through the suspending medium out of the dispersion collection chamber and into the polymerization vessel. Most preferably, the droplets are flowed in a cocurrent type operation, the relative feed rates of the monomer phase and suspending medium to the dispersion collection chamber being selected such that the polymerization medium in the polymerization vessel comprises from about 30 to about 60 volume percent monomer phase.

Preferably, the movement of the monomer droplets through the dispersion collection chamber into the polymerization vessel is accomplished with little or no polymerization thereof. In general, the degree of polymerization of the monomer droplets before they are transferred to the polymerization vessel is less than a degree which causes significant gelation thereof. Advantageously, less than 10 weight percent, preferably less than about 2 weight percent of the monomers are polymerized before the droplets are transferred into the reaction vessel.

The polymerization reaction vessel is advantageously agitated to prevent significant coalescence or additional dispersion of the monomer droplets during the polymerization thereof. In general, the conditions of agitation are selected such that (a) the monomer droplets are not significantly resized by the agitation, (b) the monomer droplets do not significantly coalesce in the reaction vessel, (c) no significant temperature gradients develop in the suspension and (d) pools of monomer, which may polymerize to form large masses of polymer, are substantially prevented from forming in the reaction vessel. In general, the foregoing conditions are advantageously met using an agitator (paddle) such as described in Bates et al., "Impeller Characteristics and Power," Mixing, Vol. I, V. W. Uhl and J. B. Gray, Eds, published by Academic Press, New York (1966), pp. 116-118. Preferably, the agitator is of the anchor or gate types, as described on pp. 116-118 of Bates et al., or is of the "loop" or "egg beater" types, which are modifications of the anchor type agitator described in Bates et al. wherein a horizontal cross member is affixed to bars of the agitator at or near the ends of said bars. More preferably, the agitator bars extend up through the surface of the suspension, thereby preventing the formation of monomer pools on the surface of the suspension.

The apparatus of this invention is improved in that said apparatus is of a geometry such that large quantities of high quality (i.e., highly uniform) beads can be prepared. For example, an apparatus as depicted in U.S. Pat. No. 4,444,961 which comprises what appears to be a circular piston and orifice plate assembly suffers numerous defects when commercial scale-up is desired. For example, a large circular orifice plate assembly can suffer from radial inflow problems induced by the buoyancy of the formed droplet. Such an inflow problem is minimized when an orifice assembly is employed which has a length which is greater than the cross-sectional width thereof. Thus, for example, an orifice plate can have a greater area and hence a greater number of passages. Another example of problems associated with a large circular piston is the fact that the large piston can flex leading to poor quality droplets. In the apparatus of this invention, large quantities of droplets of high quality can be prepared using a small size piston. In addition, mechanical resonances in the large size piston assembly can substantially affect the quality of droplets. Such resonances are minimized in the apparatus of this invention wherein a small size piston assembly can be employed.

What is claimed is:

1. An apparatus for preparing large numbers of spheroidal polymer beads having a uniform particle size, said apparatus comprising (1) a monomer reservoir containing a monomer phase comprising a polymerizable monomer, (2) a dispersion collection chamber containing a continuous phase of a suspending liquid immiscible with the polymerizable monomer or monomer phase and a stabilizing amount of a suspending agent, (3) a monomer jet forming means having a length greater than the cross-sectional width thereof and capable of forming a multiplicity of monomer jets which is in intimate contact with the monomer phase in the monomer reservoir and the continuous liquid phase in the dispersion collection chamber, and which has a multiplicity of openings connecting said reservoir and said collection chamber, such that the monomer phase passing therethrough into the continuous phase is capable of being a jet having laminar flow characteristics, (4) a vibratory exciter capable of vibratorily exciting the laminar flow jet of the monomer phase such that the monomer jet is broken into droplets wherein the vibratory exciter is essentially parallel to the axis of the monomer jet, and (5) a means for polymerizing the monomer in suspension at conditions such that significant coalescence or additional dispersion of monomer droplets does not occur.

2. The apparatus of claim 1 which further includes a means for introducing the suspending liquid into the dispersion collection chamber containing the continuous phase in close proximity to the jet forming means such that the monomer droplets and continuous phase flow through the dispersion collection chamber in an essentially cocurrent manner.

3. The apparatus of claim 2 wherein the jet forming means is a cylinder or plate having a plurality of generally cylindrical or frusto-conical passages, each passage having a cross-section of a diameter from about 0.08 to about 0.4 mm.

4. The apparatus of claim 3 wherein each passage of the orifice plate is spaced sufficiently apart such that the formation mechanism of the droplets is not significantly and deleteriously affected by an adjacent laminar flow jet and droplet formation therefrom.

5. The apparatus of claim 4 wherein each passage has a length less than about 10 times the diameter and wherein each passage is spaced at least about 1 mm and about 20 times the passage diameter from the passage nearest thereto when said distance is measured from the center of each passage.

6. The apparatus of claim 1 wherein the means for vibratorily exciting the laminar flow jet is parallel to the axis of the monomer jet.

7. The apparatus of claim 1 wherein the monomer jet forming means is an orifice assembly.

8. The apparatus of claim 7 wherein the length of the orifice assembly is about twice that of the cross-sectional width thereof.

9. The apparatus of claim 7 wherein the length of the orifice assembly is about 10 times that of the cross-sectional width thereof.

10. The apparatus of claim 7 wherein the length of the orifice assembly is about 20 times that of the cross-sectional width thereof.

11. The apparatus of claim 7 wherein the orifice assembly is an orifice plate assembly having a rectangular shape.

* * * * *